United States Patent
Daoud

(10) Patent No.: US 6,263,145 B1
(45) Date of Patent: Jul. 17, 2001

(54) DENSELY PACKED CABLE PORT LAYOUT

(75) Inventor: Bassel Hage Daoud, Parsippany, NJ (US)

(73) Assignee: Avaya Technology Corp, Basking Ridge, NJ (US)

( * ) Notice: Subject to any disclaimer, the term of this patent is extended or adjusted under 35 U.S.C. 154(b) by 0 days.

(21) Appl. No.: 09/371,361

(22) Filed: Aug. 10, 1999

(51) Int. Cl.⁷ .................................................. G02B 6/00
(52) U.S. Cl. .......................... 385/139; 385/136; 385/137; 385/138
(58) Field of Search .................... 385/136–139; 439/694, 695, 92, 41

(56) References Cited

U.S. PATENT DOCUMENTS

| | | | |
|---|---|---|---|
| 4,913,522 | 4/1990 | Nolf et al. | 350/98.2 |
| 5,155,794 | 10/1992 | Nolf et al. | 385/135 |
| 5,249,253 | 9/1993 | Franckx et al. | 385/135 |
| 5,491,766 | * 2/1996 | Daoud | 385/100 |
| 5,602,954 | 2/1997 | Nolf et al. | 385/135 |

* cited by examiner

*Primary Examiner*—Georgia Epps
*Assistant Examiner*—Michael A. Lucas
(74) *Attorney, Agent, or Firm*—Duane Morris & Heckscher LLP

(57) ABSTRACT

An end cap for a telecommunications enclosure has a perimeter. The end cap has a plurality of cable receptacle tubes arranged around its perimeter. Each of the cable receptacle tubes has a plug at an end of the tube opposite the end cap. Each tube has a respective height. A first one of the tubes has the greatest height. Successive cable receptacle tubes on each side of the first tube decrease in height monotonically from the height of the first tube. The difference in height between two consecutive tubes is greater than or equal to a thickness of a blade used to cut the plug off of the tubes. The space between consecutive cable receptacle tubes is substantially less than a width of a blade used to cut the plug off of the tubes. The end cap may have a plane of symmetry passing through the highest cable receptacle tube. To use the end cap, the plug is cut off of the first (highest) cable receptacle tube. A cable is secured to the first tube. The plug is cut off of a second one of the cable receptacle tubes adjacent the first tube, the second tube being shorter than the first tube. Successive cables are added to the enclosure by alternately cutting off the end caps on opposite sides, so that the next end cap cut is always the largest end cap remaining.

24 Claims, 5 Drawing Sheets

200

200

DENSELY PACKED CABLE PORT LAYOUT

FIELD OF THE INVENTION

The present invention relates to telecommunications generally, and more specifically to enclosures for telecommunications cables and equipment.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation.

U.S. Pat. Nos. 4,913,522, 5,155,794 and 5,602,954 to Nolf et al., and U.S. Pat. No. 5,249,253 to Franckx et al. are expressly incorporated by reference herein in their entireties. These patents describe an enclosure for a butt splice of optical fiber cables. The enclosure generally includes an end cap and a dome-shaped cover which together form a hollow article for use as a butt splice case for optical fibre cables. Outlets are provided in the end cap through which the cables pass. On a new installation, only some of the outlets may be required, and some may therefore be temporarily blocked. The outlets are made with closed ends which are simply cut off as required.

FIG. 1 of the present application shows a conventional end cap 10. The end cap has a plurality of cable receptacle tubes 11–16 arranged around a perimeter of the end cap. Each cable receptacle tube 11–16 has a disk 11a–16a on its distal end distal opposite the flat surface 24 of the end cap 10. The disks 11a–16a block the cable receptacle tubes 11–16 until the disks are cut off to use the tubes. A saw blade 50 is shown.

Because the disks 11a–16a of the cable receptacle tubes 11–16 are typically cut off one at a time in situ as new cables are added to the enclosure, it is necessary to leave sufficient room between cable receptacle tubes to insert the saw blade 50 for cutting. As a result, the cable receptacle tubes 11–16 are spaced far apart, leaving room for only a small number of cable receptacle tubes 11–16 on each end cap 10.

A method of increasing the number of cable receptacle tubes is desired.

SUMMARY OF THE INVENTION

The present invention is an end cap for a telecommunications enclosure. The end cap has a perimeter. The end cap has a plurality of cable receptacle tubes arranged around the perimeter. Each cable receptacle tube has a respective height. A first one of the cable receptacle tubes has a greatest height. Successive cable receptacle tubes on each side of the first cable receptacle tube decrease in height monotonically from the height of the first cable receptacle tube.

Another aspect of the invention is an end cap for a telecommunications enclosure. The end cap has a perimeter, a first end and a second end diametrically opposed to the first end. The end cap has a plurality of cable receptacle tubes arranged around its perimeter. Each cable receptacle tube has a respective height. The height of the cable receptacle tubes decreases monotonically between the first end and the second end.

Still another aspect of the invention is an end cap for a telecommunications enclosure. The end cap has a perimeter. The end cap has a plurality of cable receptacle tubes arranged around its perimeter. Each cable receptacle tube has a flat surface at a distal end thereof. Each of the flat surfaces is tilted in the tangential direction.

A further aspect of the invention is a method for using an end cap for a fiber enclosure, wherein the end cap has a plurality of cable receptacle tubes arranged around its perimeter, and each cable receptacle tube has a plug on an end distal from the end cap. The method includes cutting the plug off of a first one of the cable receptacle tubes. A cable is secured to the first cable receptacle tube. The plug is cut off of a second one of the cable receptacle tubes adjacent the first cable receptacle tube, the second cable receptacle tube being shorter than the first cable receptacle tube.

DETAILED DESCRIPTION

Figure 1:
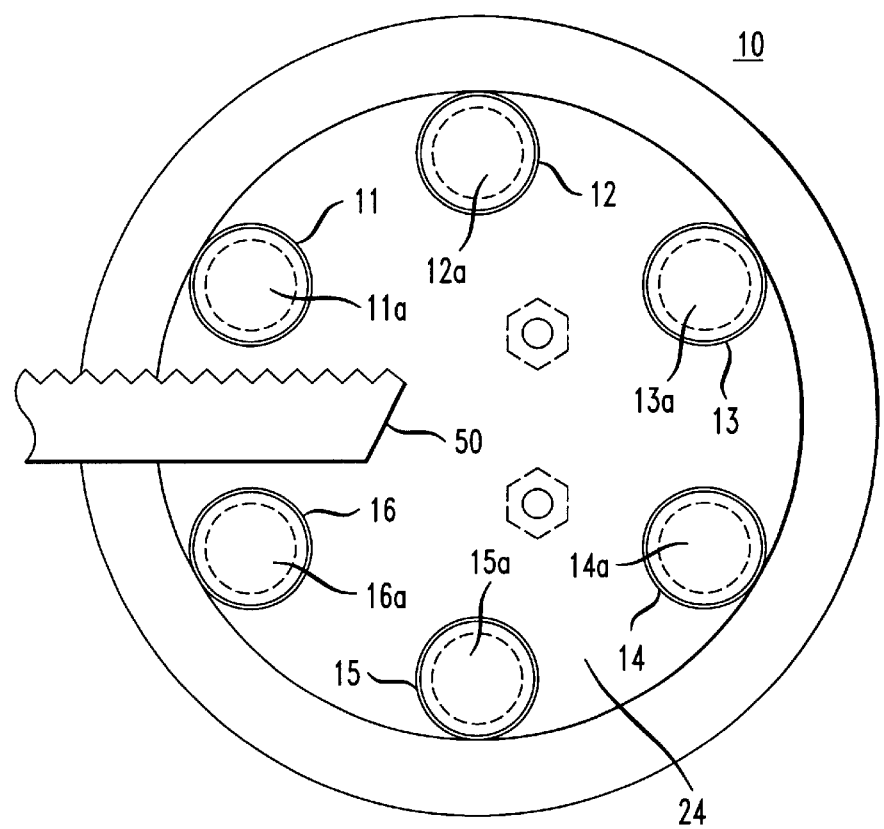
FIG. 1 is a plan view of a conventional end cap of a telecommunications enclosure.
Figure 2:
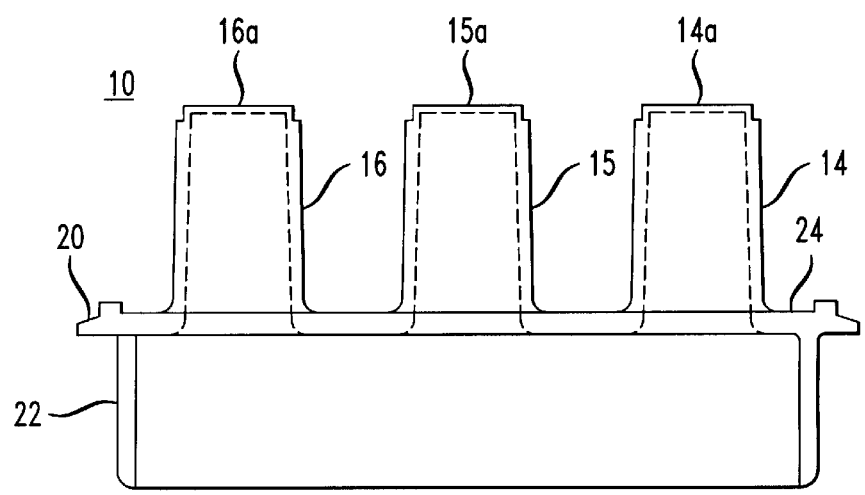
FIG. 2 is a side elevation view of the end cap of FIG. 1.
Figure 3:
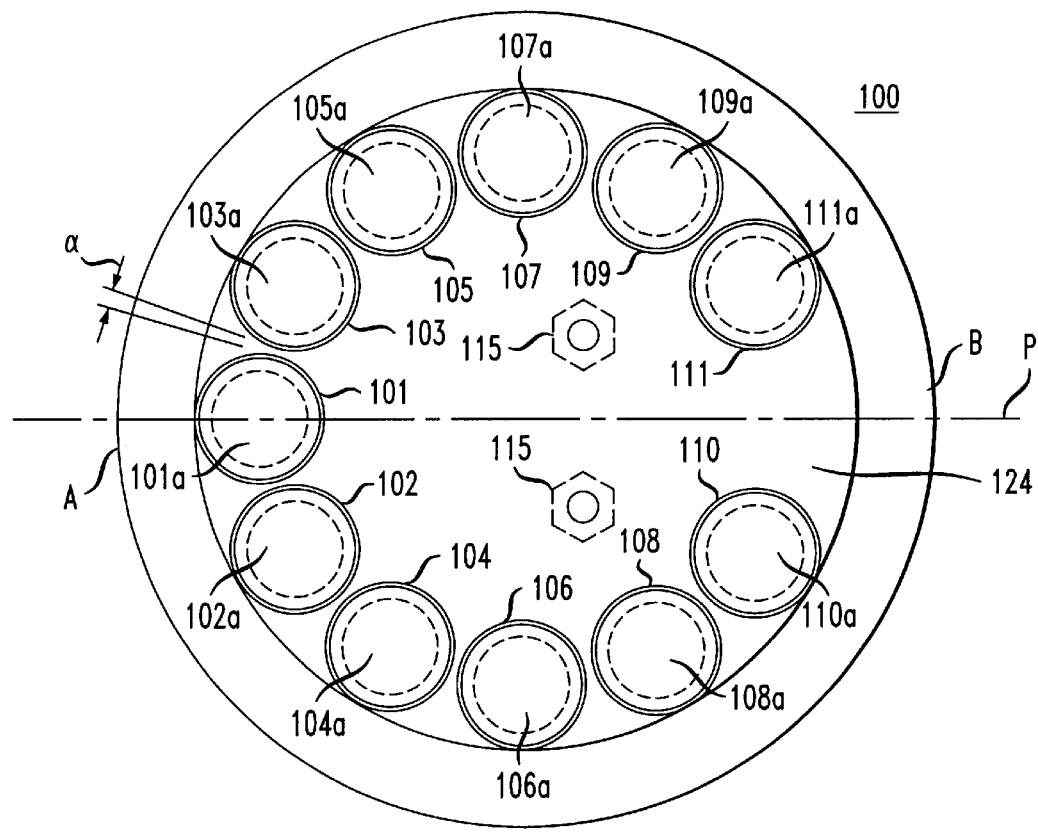
FIG. 3 is a plan view of a first exemplary end cap according to the present invention.
Figure 4:
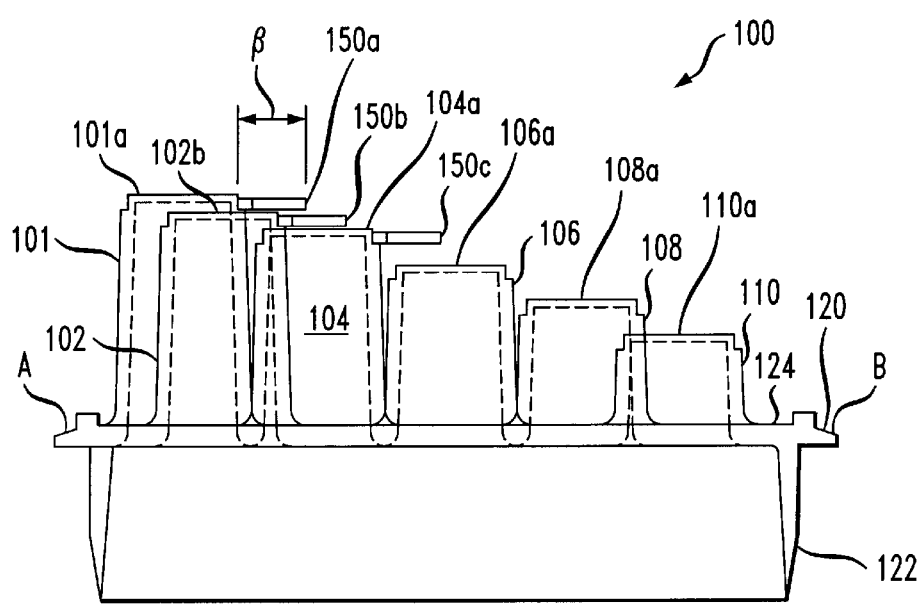
FIG. 4 is a side elevation view of the end cap of FIG. 3.

FIGS. 3 and 4 show a first exemplary end cap 100 for a telecommunications enclosure according to the invention. The end cap 100 has a perimeter. A plurality of cable receptacle tubes 101–111 are arranged around the perimeter of end cap 100. Each cable receptacle tube 101–111 has a respective height. The first cable receptacle tube 101 has the greatest height. Successive cable receptacle tubes 102–111 on each side of the first cable receptacle tube 101 decrease in height monotonically (i.e., continually decrease without any intermediate increase) from the height of the first cable receptacle tube. For example, the odd numbered cable receptacle tubes 103, 105, 107, 109 and 111 decrease montonically, as shown in FIG. 4. The even numbered cable receptacle tubes 102, 104, 106, 108 and 110 (hidden in FIG. 4) also decrease in height monotonically.

In other words, the end cap 100 has a first end A and a second end B diametrically opposed to the first end A. The end cap 100 has a plurality of cable receptacle tubes 101–111 arranged around its perimeter. Each cable receptacle tube has a respective height. The heights of the cable receptacle tubes 101–111 decrease monotonically between the first end A and the second end B.

In the exemplary embodiment, the end cap 100 has a plane of symmetry P (shown in FIG. 3), which passes through the first cable receptacle tube 101. The exemplary cable receptacle tubes (other than the first tube 101) are arranged in pairs of tubes having the same height as each other. Thus, tubes 102 and 103 have the same height; tubes 104 and 105 have the same height; tubes 106 and 107 have the same height; tubes 108 and 109 have the same height;

and tubes 110 and 111 have the same height. This is optional, however. The odd numbered tubes are not required to have the exact same height as the corresponding even numbered tubes, so long as the odd numbered tubes 101, 103, 105, 107, 109 and 111 decrease in height monotonically and the even numbered tubes 102, 104, 106, 108 and 1 10 decrease in height monotonically.

As best seen in FIG. 4, each of the cable receptacle tubes 101–111 has a disk or plug 101a–111a, respectively, at an end of the cable receptacle tube opposite the surface 124 of the end cap 100. The difference in height between any two consecutive cable receptacle tubes is greater than or equal to a thickness of a blade 150a–150c used to cut the plug off of the cable receptacle tubes. For example, the difference between the heights of tubes 101 and 102 is greater than the thickness of blade 150a, which is used to cut the plug 101a off of tube 101. A single blade 150a may be used to cut all of the cable receptacle tubes 101–111. The identification of three blades 150a–150c in FIG. 4 is solely to allow specific reference to a blade at a specific location for cutting each cable receptacle tube 101–111. Alternatively, multiple blades may be used, to replace any blade that becomes dull.

The difference in height between any two consecutive ones of the exemplary cable receptacle tubes 101–111 is greater than or equal to about 0.75 millimeters (0.03 inch), which is sufficient to accommodate a typical saw blade, utility knife or the like.

Although the differences between the heights of consecutive cable receptacle tubes is not a constant in FIG. 4, the differences may optionally all be the same.

According to another aspect of the exemplary embodiment, the space α (shown in FIG. 3) between consecutive cable receptacle tubes is substantially less than a width β (FIG. 4) of a typical blade used to cut the plug off of the cable receptacle tubes. More particularly, the limiting factor controlling the minimum space between adjacent cable receptacle tubes is the thickness of the heat shrink tubing 131 (FIG. 5) that is used to secure and seal the cables 132 (FIG. 5) to the cable receptacle tubes 101. For example, an exemplary space a between consecutive cable receptacle tubes is less than or equal to about 2.5 millimeters (0.1 inch). A typical blade 150a of a utility knife, hand saw or cutter has a width of about 12 millimeters (0.5 inch). Thus, an end cap 100 according to the invention has a much greater density of cable receptacle tubes than the end caps of the prior art. This results in the ability to run many more cables into a given enclosure 160 (FIG. 5).

In the exemplary embodiment of FIG. 3, the end cap 100 has an odd number of cable receptacle tubes 101–111, and the plane of symmetry P passes through the first cable receptacle tube 101 (the tube having the greatest height.)

Figure 5:
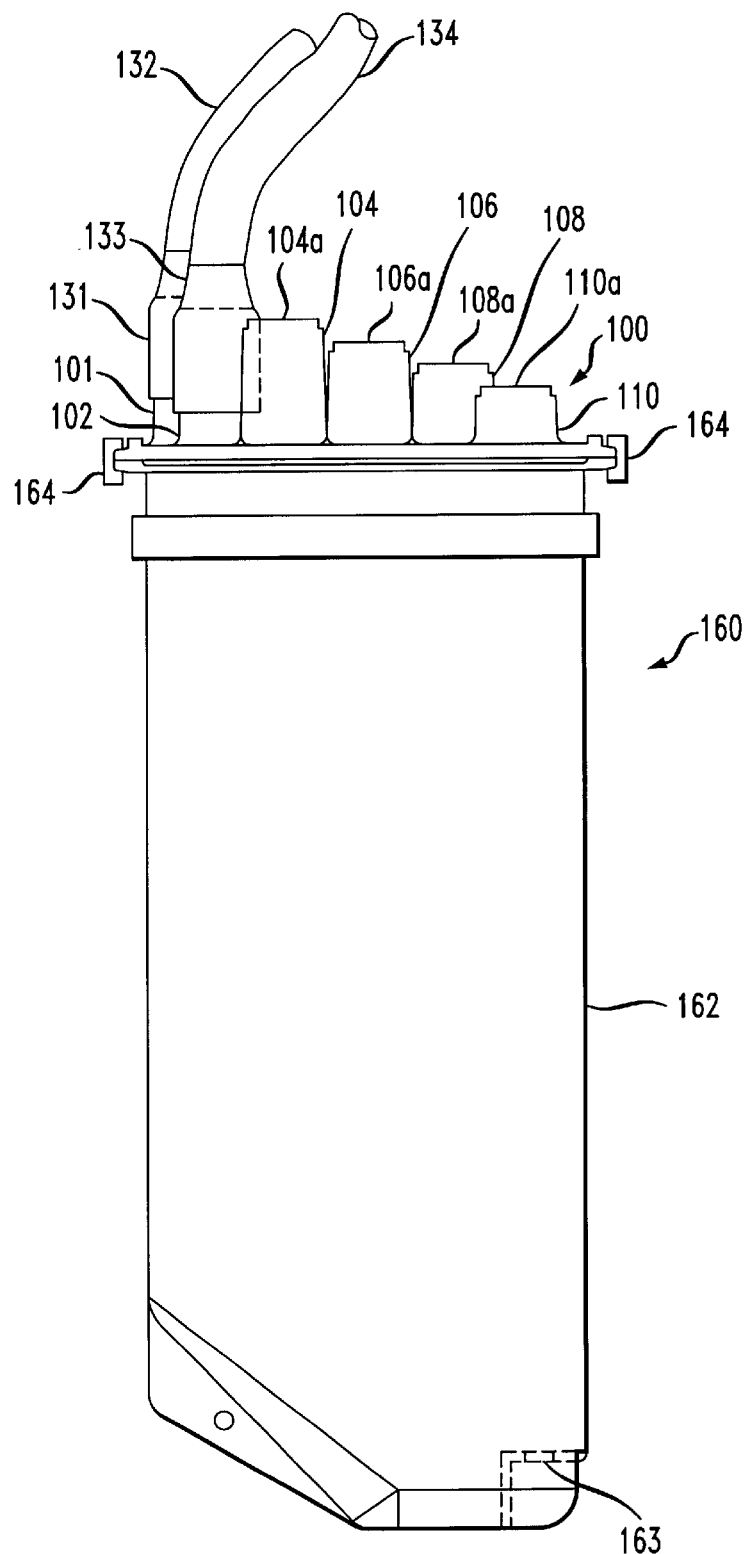
FIG. 5 is a side elevation view of an enclosure assembly including the end cap of FIG. 3.

FIG. 5 shows a telecommunications enclosure assembly 160 including the end cap 100 and a dome like enclosure 162. The exemplary enclosure assembly 160 is a fiber optic enclosure, into which fiber and equipment (not shown), are installed. The interior of the enclosure assembly 160 may contain a card cage (not shown) having slots for accommodating a plurality of printed circuit boards having electrical circuits and/or electrical/optical transducers (not shown). The electrical circuits may provide a variety of functions, such as processing optical and electrical voice, data, and/or video signals, generating alarms and various signaling information, etc. The contents of the enclosure may include a tray having a plurality of attachment sections into which optical fiber splices, connectors or standard end fiber terminations can be retained. Optical fiber which is not being coupled within the enclosure assembly 160 may also be stored within the enclosure.

When the end cap 100 is installed on the enclosure 162, a clamp 164, which may be a V-clamp, is applied to secure the end cap 100 in place on the enclosure 162. U.S. Pat. No. 5,315,489 to McCall et al. is expressly incorporated by reference herein for its teachings on a clamp suitable for use on fiber enclosures. A clamp as described by McCall et al. may be used to clamp the enclosure assembly 160.

A conventional o-ring (not shown) may be used to provide a water-tight seal between the end cap 100 and the enclosure 160. Alternatively, if the membrane 122 depending from end cap 100 is formed of a suitably soft, pliable material such as polypropylene, the application of air pressure inside the enclosure assembly 160 after the clamp 164 is put in place causes the membrane 122 (shown in FIG. 4) to deform outward and form a water-tight seal against the inner rim of the enclosure 160. The wedge-shaped cross section of membrane 122 facilitates this self-sealing action. An opening 163 is provided on the enclosure 162, into which a valve (not shown) is installed. The pressurized air is introduced into the enclosure assembly 160 by way of the valve. Once assembled, the enclosure assembly 160 may be mounted on a pole, using mounting holes 215 in the end cap (shown in FIG. 3).

As shown in FIG. 5, the insertion of cables proceeds from the tallest cable receptacle tube 101 to the shortest cable receptacle tube 111. The method of adding cables 132, 134 to the enclosure includes cutting the plug 101a off of a first cable receptacle tube 101, using the blade 150a (shown in FIG. 4). Because the second cable receptacle tube 102 is shorter than the first cable receptacle tube 101, tube 102 does not interfere with the movement of the blade 150a during cutting, regardless of how closely the tubes 101 and 102 are positioned relative to each other. A cable 132 is secured to the first cable receptacle tube 101. To secure the cable, a sleeve 131 of heat shrink tubing is placed over the tube 101 and the cable 132 is inserted through the sleeve and through the cable receptacle tube. Heat is applied uniformly to the heat shrink tubing 131 to shrink the tubing. The tubing 131 seals the cable port, and aligns the cable with the tube 101.

To add the second cable 134, the plug 102a is cut off of the second cable receptacle tube 102, which is adjacent the first cable receptacle tube 101. The cable receptacle tube 104 is shorter than the second cable receptacle tube 102, so tube 104 does not interfere with the blade 150b during cutting.

Although hidden in FIG. 5, the third cable receptacle tube to be cut is tube 103. Successive cables are added to the enclosure by alternately cutting off the end caps on opposite sides, so that the next end cap cut is always an end cap having the largest remaining height. Essentially, the next adjacent cable receptacle tube is alternately selected on each side of the first cable receptacle tube; the plug is cut from the selected cable receptacle tube, and a cable is secured therein.

After using tube 103, the remaining cable receptacle tubes may be used in the order 104, 105, 106, 107, 108, 109, 110 and 111. However, for purposes of the present invention, it is immaterial whether the first three end caps are cut in the order 101, 102, 103 or the order 101, 103, 102. Thus, the order in which the tubes are used may be 101, 103, 102, 105, 104, 107, 106, 109, 108, 111, 110. In general, for each pair of corresponding cable receptacle tubes on opposite sides of the axis P, the tubes within the pair may be used in either order.

It is also possible to use all of the cable receptacle tubes on one side of the axis of symmetry P, before using the tubes on the other side of the axis P. For example, the tubes maybe cut in the order 101, 102, 104, 106, 108, 110, 103, 105, 107, 109, 111. If this is done, however, care must be exercised to ensure that the cutting blade does not extend all the way across the diameter of the end cap and pierce the previously installed cables.

Although the exemplary method of securing the cables 132, 134 to the end cap 100 includes the use of heat shrink tubing 131, 133, other methods of securing the cables to the cable receptacle tubes 101–111 of the end cap are contemplated within the scope of the invention.

Figure 6:
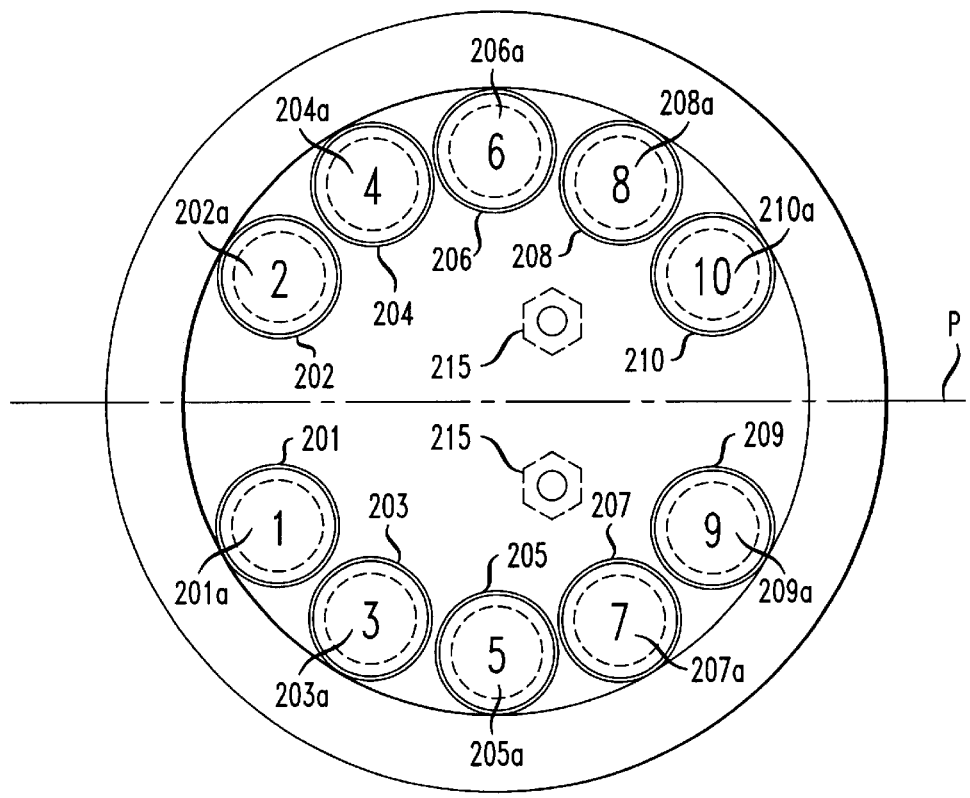
FIG. 6 is a plan view of a second exemplary end cap according to the present invention.
Figure 7:
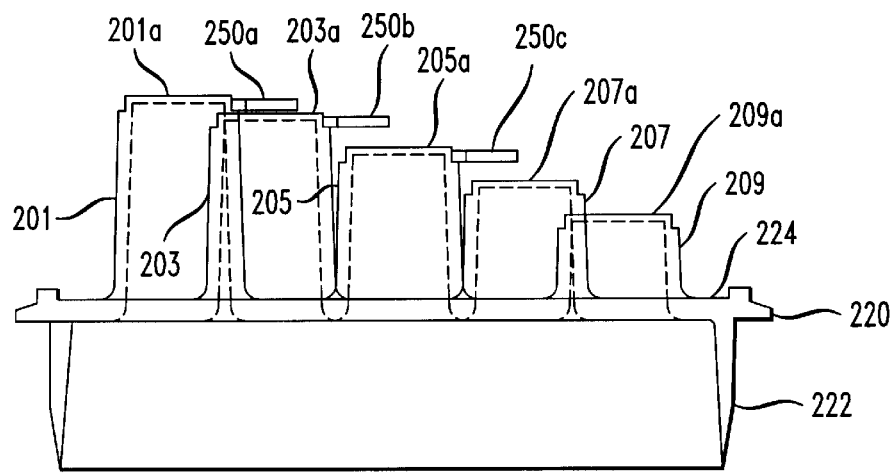
FIG. 7 is a side elevation view of the end cap of FIG. 5.

FIG. 7 shows another exemplary end cap 200 according to the invention. The end cap 200 is similar to the end cap 100, with only a few differences explained below. End cap 200 has no cable receptacle tube on the axis of symmetry P. As shown by FIG. 6, the invention may be practiced using either an odd or an even number of cable receptacle tubes.

The end cap 200 also includes indicia on the plugs 101a–110a of each respective cable receptacle tube 101–110. The indicia identify the preferred order for using the cable receptacle tubes. This facilitates use by personnel who are unfamiliar with the end cap 200. By using the remaining tube having the lowest number (as indicated by the indicia), the user is assured that the cable receptacle tubes are cut in the correct order.

The method of using the end cap 200 includes cutting the plugs off of a first pair 201, 202 of the plurality of cable receptacle tubes 201–210. A respective cable (not shown in FIG. 6) is secured to each of the first pair 201, 202 of cable receptacle tubes.

The tubes 201, 202 of the first pair may be cut and used at the same time, or one of the tubes 201 may be cut first, and the second tube 202 cut at a later date. After both tubes 201 and 202 are used, when additional cables are to be inserted, the plugs are cut off of a second pair 203, 204 of the cable receptacle tubes. Each tube 203, 204 in the second pair is adjacent to and shorter than the cable receptacle tubes in the first pair 201, 202. A respective cable (not shown) is secured to each of the second pair of cable receptacle tubes 203, 204.

In general, the method further includes cutting the plugs off of an Nth pair of the cable receptacle tubes (where N is an integer greater than two, and each tube in the Nth pair is adjacent to and shorter than the cable receptacle tubes in the most recently cut pair of cable receptacle tubes), and securing a respective cable to each of the Nth pair of cable receptacle tubes.

Figure 8:
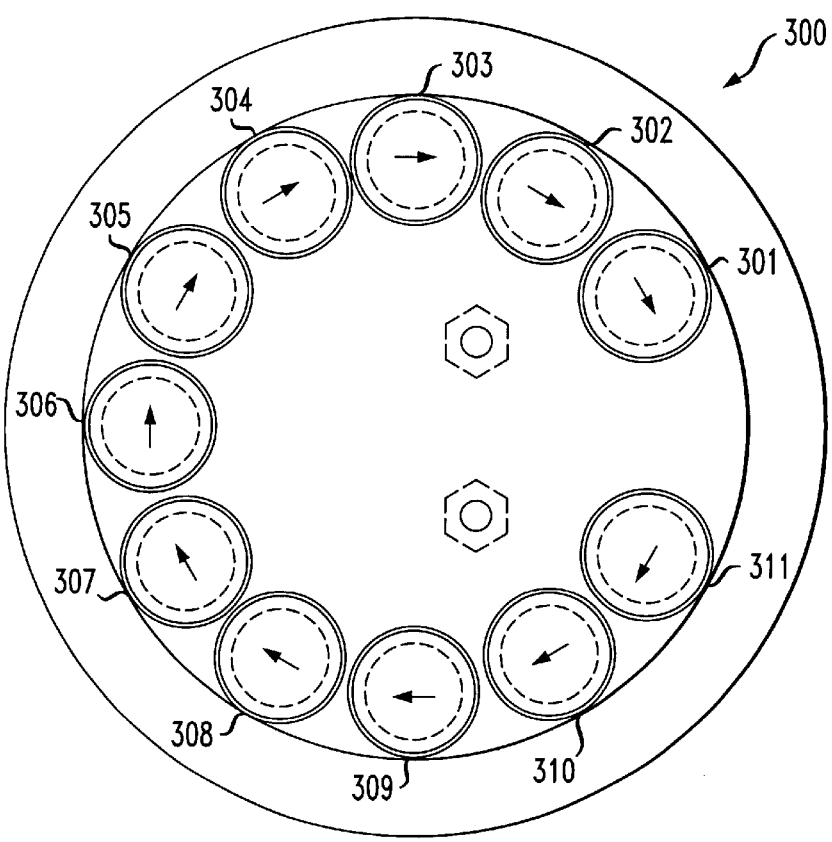
FIG. 8 is a plan view of a third exemplary end cap according to the present invention.
Figure 9:
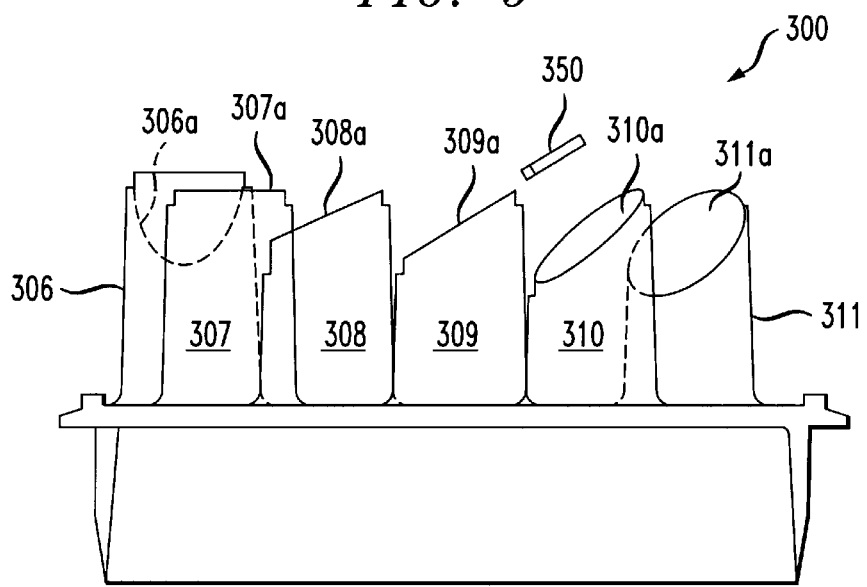
FIG. 9 is a side elevation view of the end cap of FIG. 8.

FIGS. 8 and 9 show a further exemplary embodiment of the invention. In the embodiment of FIGS. 8 and 9, end cap 300 has a plurality of cable receptacle tubes 301–311. The distal flat surfaces or plugs 301a–311a of each tube 310–311 are all tilted, so that the normal to each surface has a component in the tangential (circumferential) direction. Although the flat surfaces 301a–311a appear as circles in FIG. 8, they are ellipses with circular projections in the plane shown in FIG. 8 (The intersection of a circular cylinder and a tilted plane is an ellipse). In FIG. 8, the arrows on the distal surfaces 301a–311a indicate the direction of the tilt. Because the distal surfaces 301a–311a are tilted, a blade 350 that cuts the distal surfaces off can be tilted and need not lie in the plane of the distal surfaces. Thus, blade 350 can approach the tubes 301–311 from above (as shown in FIG. 9), instead of from alongside the tubes 301–311. This allows the cable receptacle tubes to be the same height. The order of cutting and using the cable tube receptacles is different for the configuration of FIGS. 8 and 9. The cables are inserted in the cable receptacles beginning with tube 301 and ending with tube 311. The embodiment of FIGS. 8 and 9 allows the cable receptacle tubes 301–311 to be spaced close together, providing another design for densely packing the cable receptacle tubes.

Although the exemplary embodiment is described in the context of an end cap for a fiber optic enclosure, the exemplary enclosure is not limited to fiber, and may be used for other electrical cables.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. An end cap for a telecommunications enclosure,
   said end cap having a perimeter,
   said end cap having a plurality of cable receptacle tubes arranged around the perimeter thereof, each cable receptacle tube having a respective height, a first one of the cable receptacle tubes having a greatest height, successive cable receptacle tubes on each side of the first cable receptacle tube decreasing in height monotonically from the height of the first cable receptacle tube.

2. The end cap of claim 1, wherein:
   each of the cable receptacle tubes has a plug at an end of the cable receptacle tube opposite the end cap; and
   a difference in height between two consecutive cable receptacle tubes is greater than or equal to a thickness of a blade used to cut the plug off of the cable receptacle tubes.

3. The end cap of claim 1, wherein a difference in height between any two consecutive cable receptacle tubes is greater than or equal to about 0.75 millimeters.

4. The end cap of claim 1, wherein:
   each of the cable receptacle tubes has a plug at an end of the cable receptacle tube opposite the end cap; and
   the space between consecutive cable receptacle tubes is substantially less than a width of a blade used to cut the plug off of the cable receptacle tubes.

5. The end cap of claim 1, wherein the space between consecutive cable receptacle tubes is less than or equal to about 2.5 millimeters.

6. The end cap of claim 1, wherein the end cap has a plane of symmetry.

7. The end cap of claim 6, wherein the end cap has an odd number of cable receptacle tubes, and the plane of symmetry passes through the first cable receptacle tube.

8. A telecommunications enclosure including the end cap of claim 1.

9. An end cap for a telecommunications enclosure,
   said end cap having a perimeter, a first end and a second end diametrically opposed to the first end,
   said end cap having a plurality of cable receptacle tubes arranged around the perimeter thereof, each cable receptacle tube having a respective height, the height of the cable receptacle tubes decreasing monotonically between the first end and the second end.

10. The end cap of claim 9, wherein:
    each of the cable receptacle tubes has a plug at an end of the cable receptacle tube opposite the end cap; and
    a difference in height between two consecutive cable receptacle tubes is greater than or equal to a thickness of a blade used to cut the plug off of the cable receptacle tubes.

11. The end cap of claim 9, wherein:

each of the cable receptacle tubes has a plug at an end of the cable receptacle tube opposite the end cap; and the space between consecutive cable receptacle tubes is substantially less than a width of a blade used to cut the plug off of the cable receptacle tubes.

12. The end cap of claim 9, wherein the end cap has a plane of symmetry.

13. The end cap of claim 12, wherein the end cap has an odd number of cable receptacle tubes, and the plane of symmetry passes through the first cable receptacle tube having the greatest height.

14. A telecommunications enclosure including the end cap of claim 9.

15. An end cap for a telecommunications enclosure, said end cap having a perimeter, said end cap having a plurality of cable receptacle tubes arranged around the perimeter thereof, each cable receptacle tube having a flat surface at a distal end thereof, each of the flat surfaces being tilted in the tangential direction.

16. The end cap of claim 15, wherein each of the flat surfaces is shaped as an ellipse.

17. The end cap of claim 15, wherein each of the cable receptacle tubes has the same height.

18. A method for using an end cap for a fiber enclosure, said end cap having a plurality of cable receptacle tubes arranged around a perimeter thereof, each cable receptacle tube having a plug on an end distal from the end cap, the method comprising the steps of:

cutting the plug off of a first one of the cable receptacle tubes;

securing a cable to the first cable receptacle tube; and cutting the plug off of a second one of the cable receptacle tubes adjacent the first cable receptacle tube, the second cable receptacle tube being shorter than the first cable receptacle tube.

19. The method of claim 18, wherein the end cap has an axis of symmetry, the method further comprising, the steps of:

securing a second cable to the second cable receptacle tube; and cutting the plug off of a third cable receptacle tube on the opposite side of the axis of symmetry from the second cable receptacle tube and securing a third cable therein, the second and third cable receptacle tubes having approximately the same height.

20. The method of claim 19, further comprising the steps of alternately selecting the next adjacent cable receptacle tube on each side of the first cable receptacle tube; and cutting off the plug from the selected cable receptacle tube, and securing a cable therein.

21. The method of claim 18, wherein the end cap has an axis of symmetry, the method further comprising the steps of:

cutting the plug off a pair of cable receptacle tubes and securing respective cables therein, the pair of cable receptacle tubes being symmetrically located on opposite sides of the axis of symmetry.

22. The method of claim 18, wherein each time a further cable is added, the further cable is secured to the one of the cable receptacle tubes having a largest size among the cable receptacle tubes that do not already have cables secured thereto.

23. A method for using an end cap for a telecommunications enclosure, said end cap having a plurality of cable receptacle tubes arranged around a perimeter thereof, each cable receptacle tube having a plug on an end distal from the end cap, the method comprising the steps of:

cutting the plugs off of a first pair of the plurality of cable receptacle tubes;

securing a respective cable to each of the first pair of cable receptacle tubes;

cutting the plugs off of a second pair of the cable receptacle tubes, each tube in the second pair being adjacent to and shorter than the cable receptacle tubes in the first pair, and securing a respective cable to each of the second pair of cable receptacle tubes.

24. The method of claim 23, further comprising the steps of:

cutting the plugs off of an Nth pair of the cable receptacle tubes, N being an integer greater than two, each tube in the Nth pair being adjacent to and shorter than the cable receptacle tubes in the most recently cut pair of cable receptacle tubes, and securing a respective cable to each of the Nth pair of cable receptacle tubes.

* * * * *